United States Patent Office 3,117,142
Patented Jan. 7, 1964

3,117,142
NOVEL PREPARATION OF ESTRADIOL
AND ESTRONE
Candido Snozzi, Maisons-Alfort, Bernard Goffinet, Paris,
Robert Joly, Montmorency, and Jean Jolly, Clichy-sur-
Seine, Bois, France, assignors to Roussel-UCLAF, S.A.,
Paris, France, a corporation of France
No Drawing. Filed July 11, 1962, Ser. No. 209,238
Claims priority, application France Mar. 1, 1961
10 Claims. (Cl. 260—397.4)

The invention relates to a novel process for the preparation of estradiol and estrone in high yields under mild reaction conditions by the isomerization of compounds having the formula

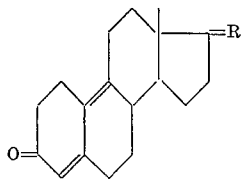

wherein R is selected from the group consisting of =O,

and

and Ac is an acyl radical of an organic carboxylic acid having 1 to 10 carbon atoms.

In the copending, commonly assigned U.S. application Serial No. 57,136, filed September 20, 1960, now Patent No. 3,056,811, and in the U.S. Patent No. 3,020,296, there is disclosed a process for the isomerization of $\Delta^{4,9}$-estradiene-17$\beta$-ol-3-one and its esters to estradiol by heating the compound at high temperatures of 170 to 180° C. in the presence of palladized carbon black.

It is an object of the invention to provide a novel process for the isomerization of compounds of formula I to the corresponding estrogens in high yields at moderate reaction conditions.

It is another object of the invention to provide a novel process for the isomerization of $\Delta^{4,9}$-estradiene-17$\beta$-ol-3-one and its carboxylic acid esters to estradiol.

It is another object of the invention to provide a novel process for the isomerization of $\Delta^{4,9}$-estradiene-3,17-dione to estrone.

These and other objects and advantages of the invention will become obvious from the following detailed description.

The process of the invention for the preparation of an estrogen selected from the group consisting of estradiol and estrone in high yields comprises reacting at temperatures of about 0° to about 100° C., preferably 10° to 30° C., a compound having the formula

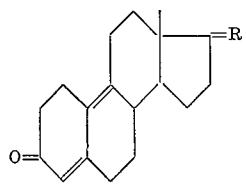

wherein R is selected from the group consisting of =O,

and

and Ac is an acyl radical of an organic carboxylic acid having 1 to 10 carbon atoms and an acid halide of a lower alkanoic acid having 1 to 7 carbon atoms in the presence of an acid anhydride of a lower alkanoic acid having 1 to 7 carbon atoms, preferably acetic acid anhydride, to form a compound having the formula

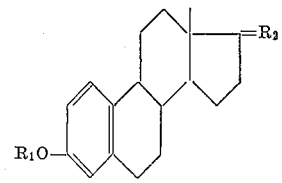

wherein $R_1$ is an acyl radical of a lower alkanoic acid having 1 to 7 carbon atoms and $R_2$ is selected from the group consisting of =O and

and Ac has the above definition, saponifying the latter under alkaline conditions to form the corresponding estrogen and recovering the latter.

The acid halides are the chlorides or bromides of a lower aliphatic acid having 1 to 7 carbon atoms. Examples of suitable acids whose halides may be used are acetic acid, propionic acid, butyric acid, isobutyric acid, etc. Preferred acid halides are acetyl chloride or acetyl bromide.

The acyl radical of 17$\beta$-acyloxy-$\Delta^{4,9}$-estradiene-3-one is the acyl radical of an organic carboxylic acid having 1 to 10 carbon atoms. The carboxylic acid may be an aliphatic acid such as acetic acid, propionic acid, butyric acid and caproic acid; and aryl acid such as benzoic acid, toluic acid and naphthoic acid; an araliphatic acid such as phenyl acetic acid; or a cycloaliphatic acid such as cyclopentanoic acid and cyclohexanoic acid.

When $\Delta^{4,9}$-estradiene-17$\beta$-ol-3-one is used as the starting compound, the ester formed is the diester of the lower alkanoic acid having 1 to 7 carbon atoms whose acid halide was reacted. When the 17$\beta$-acyloxy-$\Delta^{4,9}$-estradiene-3-one is the starting material, the 17$\beta$-acyloxy group remains and the 3-acyloxy radical is derived from the lower alkanoic acid whose acid halide was reacted with the ester.

The saponification is effected under alkaline conditions in the presence of an inert organic solvent such as a lower alkanol. The use of an alkali metal hydroxide such as sodium hydroxide or potassium hydroxide in methanol is preferred.

The process of the invention permits the isomerization to be effected at low temperatures of 0° to 100° C., preferably about 10° to 30° C., with higher yields than by the known isomerizations.

The starting materials, 17$\beta$-acyloxy-$\Delta^{4,9}$-estradiene-3-one, may be prepared by cyclizing $\Delta^{8,9}$-3-methyl-7-oxo-8-(3'-oxobutyl)-3,4-[3'-acyl-cyclopentano-(2',1')] - octahydronaphthalene in the presence of sodium tertiary amylate as described in copending, commonly assigned application Serial No. 57,136.

The starting material, $\Delta^{4,9}$-estradiene-17$\beta$-ol-3-one, may be prepared as described in U.S. Patent No. 3,020,296.

The starting material $\Delta^{4,9}$-estradiene-3,17-dione or 19-nor-$\Delta^{4,9}$-androstadiene-3,17-dione, may be prepared according to the method of Perelman et al., J.A.C.S., vol. 82 (1960), p. 2402–3.

EXAMPLE I

*Preparation of Estradiol*

(A) ISOMERIZATION OF 17β-BENZOYLOXY-Δ⁴,⁹-ESTRADIENE-3-ONE 5 g. of 17β-benzoyloxy-Δ⁴,⁹-estradiene-3-one obtained according to copending, commonly assigned U.S. patent application Serial No. 57,136 were introduced into a mixture of 50 cc. of acetic anhydride and 25 cc. of acetyl chloride under an atmosphere of nitrogen. The reaction mixture was heated to reflux for a period of 4½ hours and then evaporated to dryness under vacuum. The crystalline residue was washed with alcohol and dried under vacuum. After recrystallization from alcohol, 4.50 g. of the 3-acetate-17β-benzoate of estradiol having a melting point of 164° C. and a specific rotation $[\alpha]_D^{20} = +72°$ ±2° (c.=0.5% in chloroform) were obtained.

(B) SAPONIFICATION 2.75 g. of the 3-acetate-17β-benzoate of estradiol were introduced into 10 cc. of methanol. 25 cc. of methanol having 10% by weight of potassium hydroxide were added and the mixture was heated to reflux under agitation and under an atmosphere of nitrogen for a period of 2 hours. After cooling, the pH was brought to 7 by addition of acetic acid and the solution was evaporated to dryness under vacuum. The residue was taken up in 25 cc. of water containing 0.5 cc. of 22° Bé. ammonia and the mixture was agitated for 1 hour. The product formed was vacuum filtered and dried. 1.72 g. of raw estradiol were obtained having a melting point of 148° C. and a specific rotation $[\alpha]_D^{20} = +58°$ ±1° (c.=0.5% in dioxane). The product was purified by crystallization from hot methylene chloride and a yield of 70% pure estradiol was obtained having a melting point of 178° C. and a specific rotation $[\alpha]_D^{20} = +79°$ (c.=1% in dioxane).

EXAMPLE II

*Preparation of Estradiol From Δ⁴,⁹-Estradiene-17β-Ol-3-One*

In a similar manner, Δ⁴,⁹-estradiene-17β-ol-3-one was isomerized to the 3,17β-diacetate of estradiol and this last compound was saponified to estradiol.

EXAMPLE III

*Isomerization of Δ⁴,⁹-Estradiene-3,17-Dione to Estrone*

0.5 gm. of Δ⁴,⁹-estradiene-3,17-dione were introduced into a mixture of 10 cc. of acetic anhydride and 2.5 cc. of acetyl chloride under an atmosphere of nitrogen. The reaction mixture was heated to reflux for a period of 4½ hours, then evaporated to dryness under vacuum. The residue was washed with ethanol and dried under vacuum. The raw acetate of estrone obtained was utilized directly for the saponification step.

All of the raw acetate of estrone was dissolved in 2.5 cc. of methanol. The mixture was agitated several minutes under nitrogen and then 0.25 cc. of a concentrated solution of sodium hydroxide were added. The agitation was continued, under nitrogen, for a period of 54 minutes. The solution was then brought to a pH of 6 by the addition of acetic acid and a mixture of ⅓ water and ⅔ ice was introduced. The reaction mixture was vacuum filtered. The filter cake was washed with water and dried under vacuum. The residue was recrystallized from ethanol and supplied 0.35 gm. of pure estrone having a melting point of 260° C. and a specific rotation $[\alpha]_D^{20} = +162°$ ±1° (c.=1% in dioxane).

EXAMPLE IV

*Preparation of Estradiol by Isomerization of 17β-Benzoyloxy-Δ⁴,⁹-Estradiene-3-One*

(A) ISOMERIZATION 10 gm. of 17β-benzoyloxy-Δ⁴,⁹-estradiene-3-one were dissolved in 15 cc. of methylene chloride and then a solution of 2.5 cc. of acetyl bromide in 5 cc. of acetic anhydride was introduced slowly under agitation while maintaining the temperature of the reaction mixture at about 20° C. The mixture was agitated for a period of one hour at about 20° C. The solution formed was poured under agitation into a mixture of concentrated ammonia water (35 cc.) and iced water (35 cc.) and the mixture was decanted. The aqueous phase was extracted with methylene chloride. The organic phases were combined and washed with water until the wash water was neutral. The methylene chloride phase thus obtained was dried and decolorized with activated carbon. The methylene chloride was removed. 10 cc. of isopropyl ether were added and the solution was distilled to dryness. The residue was taken up with 30 cc. of isopropyl ether. This mixture was heated to reflux under agitation for a period of several minutes, then cooled to a temperature of between 0° and +5° C. and maintained at this temperature for a period of one hour while continuing the agitation throughout. The solution was vacuum filtered and the filter cake was triturated with 15 cc. of isopropyl ether, dried under vacuum and 9.72 gm. (yield 87.5%) of the pure 3-acetate 17β-benzoate of estradiol was obtained having a melting point of 162° C. and a specific rotation $[\alpha]_D^{20} = +72°$ (c.=0.5% in chloroform).

(B) SAPONIFICATION 9 gm. of the 3-acetate-17-benzoate of estradiol were introduced into 120 cc. of methanol and the solution was agitated. Then 9 cc. of a concentrated solution of sodium hydroxide were added and the mixture was heated to reflux under nitrogen and under agitation for a period of three hours until solution was complete. The solution was acidified to a pH of 6 by the addition of about 3 cc. of acetic acid and concentrated under agitation to a volume of about 30 cc. After cooling to room temperature, 0.3 cc. of concentrated ammonia solution were added. The reaction mixture was vacuum filtered. The filter cake was washed with water until the wash waters were neutral and dried under vacuum. The raw estradiol obtained furnished by recrystallization from acetone, then from methylene chloride, 5.6 gm. (yield 96%) of pure estradiol having a melting point of 177° C. and a specific rotation $[\alpha]_D^{20} = +79°$ (c.=1% in dioxane).

EXAMPLE V

*Preparation of Estrone by Isomerization of Δ⁴,⁹-Estradiene-3,17-Dione*

5 gm. of Δ⁴,⁹-estradiene-3,17-dione were dissolved in 7.5 cc. of methylene chloride. Then a solution of 1.25 cc. of acetyl bromide in 2.5 cc. of acetic anhydride was slowly introduced under agitation while maintaining the temperature of the reaction mixture in the neighborhood of 20° C. Next the reaction mixture was agitated for a period of 4 hours at a temperature of about 20° C. The solution obtained was then poured under agitation into a mixture of concentrated ammonia water (15 cc.) and ice (15 gm.). The solution was decanted and the aqueous phase was extracted with methylene chloride. The organic phases were combined and washed with water until the wash waters were neutral. The methylene chloride solution thus obtained was dried, decolorized with activated carbon, vacuum filtered and the methylene chloride removed. The residue comprises the raw 3-acetate of estrone which is utilized directly for the saponification phase.

All of the raw acetate of estrone was dissolved in 25 cc. of methanol and the solution was agitated under an atmosphere of nitrogen. Then 2.5 cc. of a concentrated solution of sodium hydroxide were added and the agitation was continued under an atmosphere of nitrogen for a period of 45 minutes. Next the solution was brought to a pH of 6 by the addition of acetic acid. Then a mixture of ⅓ water and ⅔ ice was introduced. The reaction mixture was vacuum filtered and the filter cake was washed with water and dried under vacuum. The raw estrone obtained furnished upon recrystallization from acetone 4 gm. (total yield 80%) of pure estrone having a melting point of 260° C. and a specific rotation $[\alpha]_D^{20} = +162° \pm 1°$ (c.=1% in dioxane).

This application is a continuation-in-part application of copending application Serial No. 176,135, filed February 27, 1962, now abandoned.

Various modifications of the process of the invention may be made without departing from the spirit or scope thereof and it is to be understood that the invention is to be limited only as defined in the appended claims.

We claim:

1. A process for the preparation of an estrogen selected from the group consisting of estradiol and estrone which comprises reacting at temperatures of about 0° to about 100° C. a compound having the formula

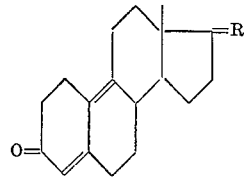

wherein R is selected from the group consisting of =O,

and

and Ac is an acyl radical of an organic hydrocarbon carboxylic acid having 1 to 10 carbon atoms and an acid halide of a lower alkanoic acid having 1 to 7 carbon atoms in the presence of an acid anhydride of a lower alkanoic acid having 1 to 7 carbon atoms to form a compound having the formula

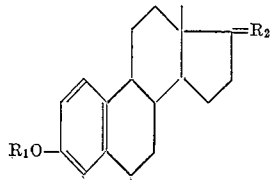

wherein $R_1$ is an acyl radical of a lower alkanoic acid having 1 to 7 carbon atoms and $R_2$ is selected from the group consisting of =O and

and Ac has the above definition, saponifying the latter in the presence of an alkali metal hydroxide to form the corresponding estrogen and recovering the latter.

2. The process of claim 1 wherein the acid halide is selected from the group consisting of acetyl chloride and acetyl bromide.

3. The process of claim 1 wherein $\Delta^{4,9}$-estradiene-3,17-dione is reacted with the acid halide.

4. The process of claim 1 wherein 17β-benzoyloxy-$\Delta^{4,9}$-estradiene-3-one is reacted with the acid halide.

5. The process of claim 1 wherein $\Delta^{4,9}$-estradiene-17β-ol-3-one is reacted with the acid halide.

6. A process for the preparation of estradiol which comprises reacting $\Delta^{4,9}$-estradiene-17β-ol-3-one with acetyl chloride at temperatures of about 0° to about 100° C. in the presence of acetic acid anhydride to form the 3,17β-diacetate of estradiol, saponifying the latter with an alkali metal hydroxide in a lower alkanol to form estradiol and recovering the latter.

7. A process for the preparation of estradiol which comprises reacting 17β-benzoyloxy-$\Delta^{4,9}$-estradiene-3-one with acetyl chloride at temperatures of about 0° to about 100° C. in the presence of acetic acid anhydride to form the 3-acetate-17β-benzoate of estradiol, saponifying the latter with an alkali metal hydroxide in a lower alkanol to form estradiol and recovering the latter.

8. A process for the preparation of estrone which comprises reacting $\Delta^{4,9}$-estradiene-3,17-dione and acetyl bromide in the presence of acetic acid anhydride at temperatures of about 0° to about 100° C. to form the 3-acetate of estrone, saponifying the latter with an alkali metal hydroxide in a lower alkanol to form estrone and recovering the latter.

9. A process for the preparation of estrone which comprises reacting $\Delta^{4,9}$-estradiene-3,17-dione and acetyl chloride in the presence of acetic acid anhydride at temperatures of about 0° to about 100° C. to form the 3-acetate of estrone, saponifying the latter with an alkali metal hydroxide in a lower alkanol to form estrone and recovering the latter.

10. A process for the preparation of estradiol which comprises reacting 17β-benzoyloxy-$\Delta^{4,9}$-estradiene-3-one with acetyl bromide in the presence of acetic acid anhydride at temperatures of about 0° to about 100° C. to form 3-acetoxy-17β-benzoyloxy-$\Delta^{1,3,5(10)}$-estratriene, saponifying the latter with an alkali metal hydroxide in a lower alkanol to form estradiol and recovering the latter.

No references cited.